July 5, 1927. 1,635,157
E. E. CLEMENT
RADIO BROADCAST DISTRIBUTING SYSTEM
Original Filed Oct. 28, 1924   6 Sheets-Sheet 1

Inventor
Edward E. Clement

July 5, 1927.  
E. E. CLEMENT  
1,635,157  
RADIO BROADCAST DISTRIBUTING SYSTEM  
Original Filed Oct. 28, 1924   6 Sheets-Sheet 2

Inventor  
Edward E. Clement

July 5, 1927.
E. E. CLEMENT
1,635,157
RADIO BROADCAST DISTRIBUTING SYSTEM
Original Filed Oct. 28, 1924   6 Sheets-Sheet 3
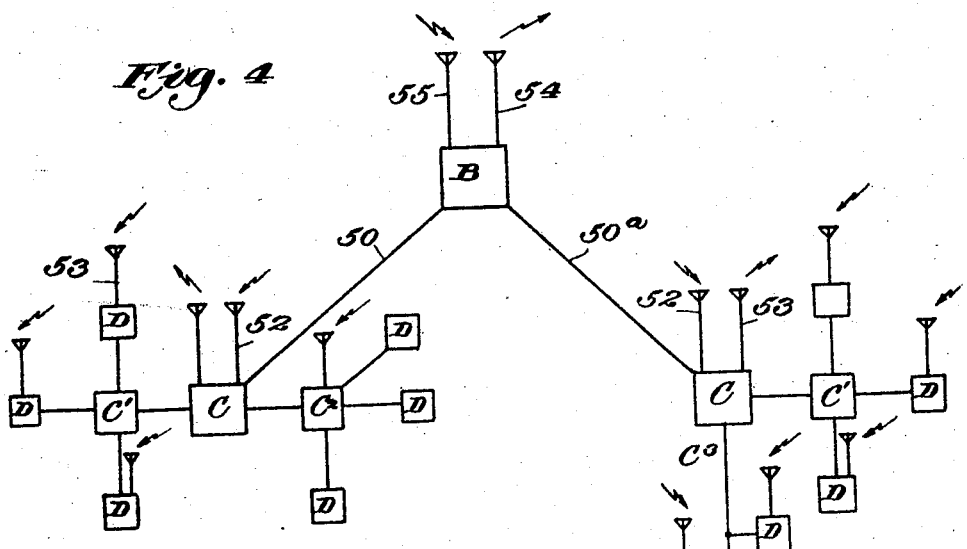
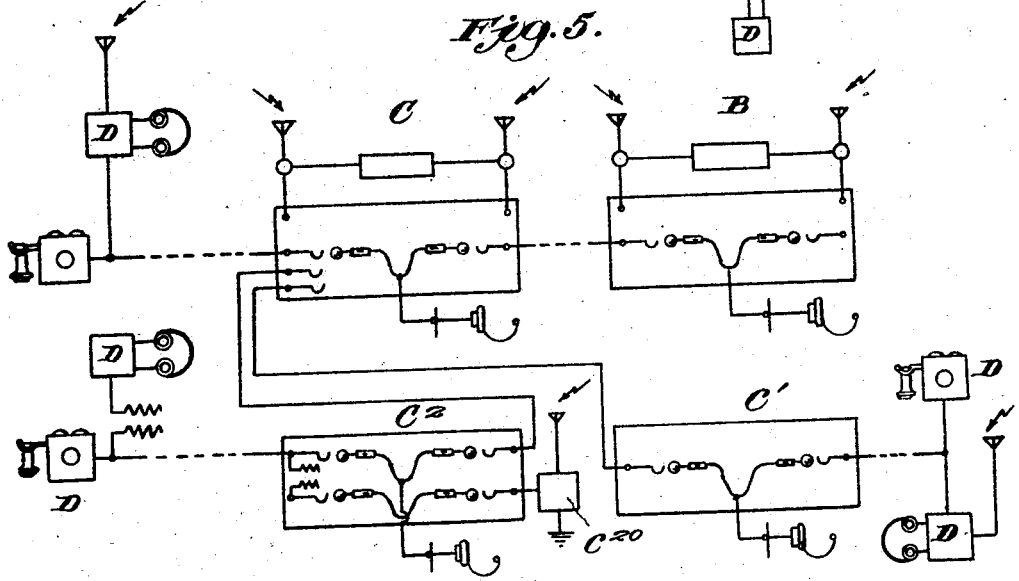
Inventor
Edward E. Clement July 5, 1927.
E. E. CLEMENT
1,635,157
RADIO BROADCAST DISTRIBUTING SYSTEM
Original Filed Oct. 28, 1924   6 Sheets-Sheet 4
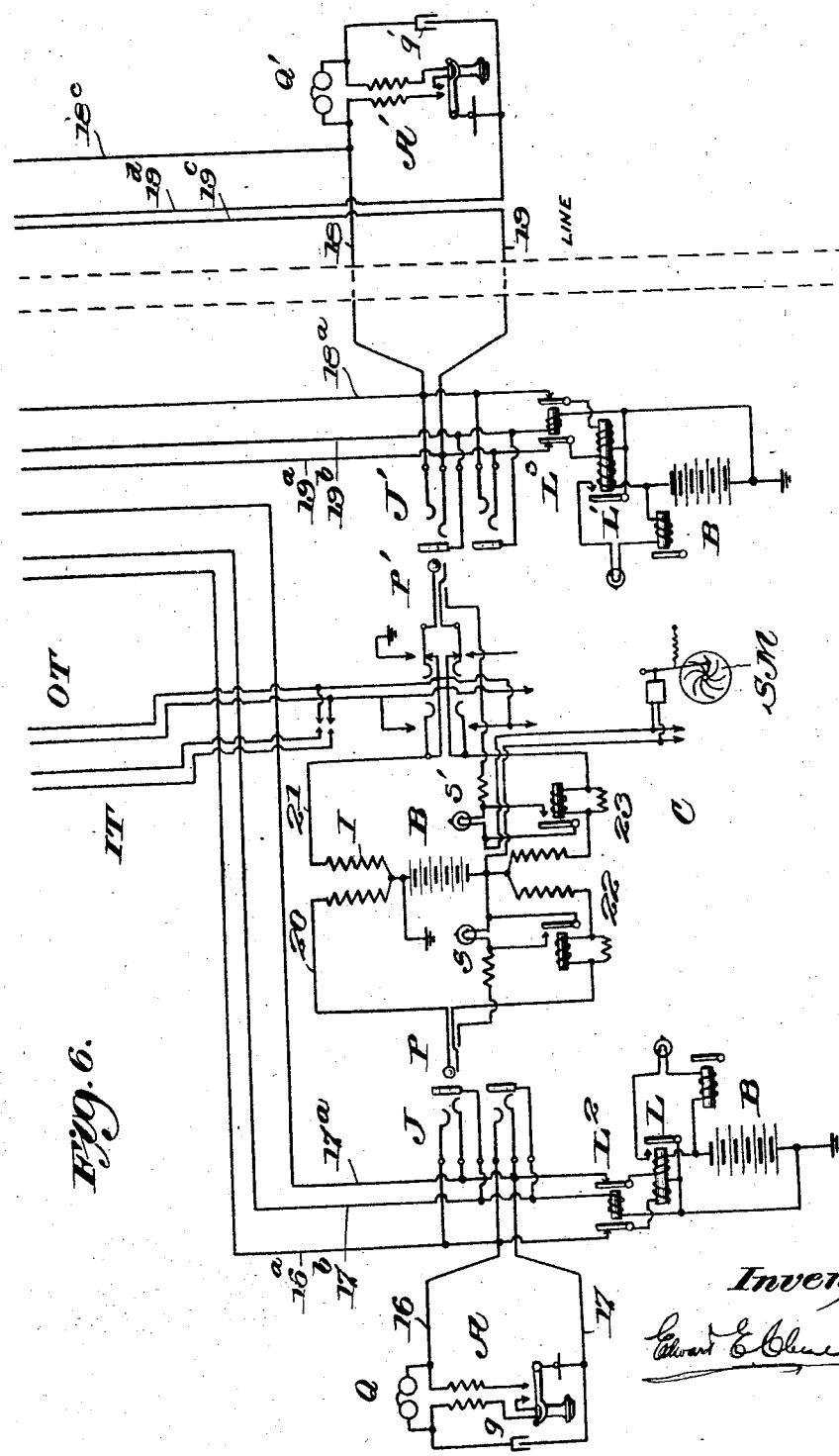

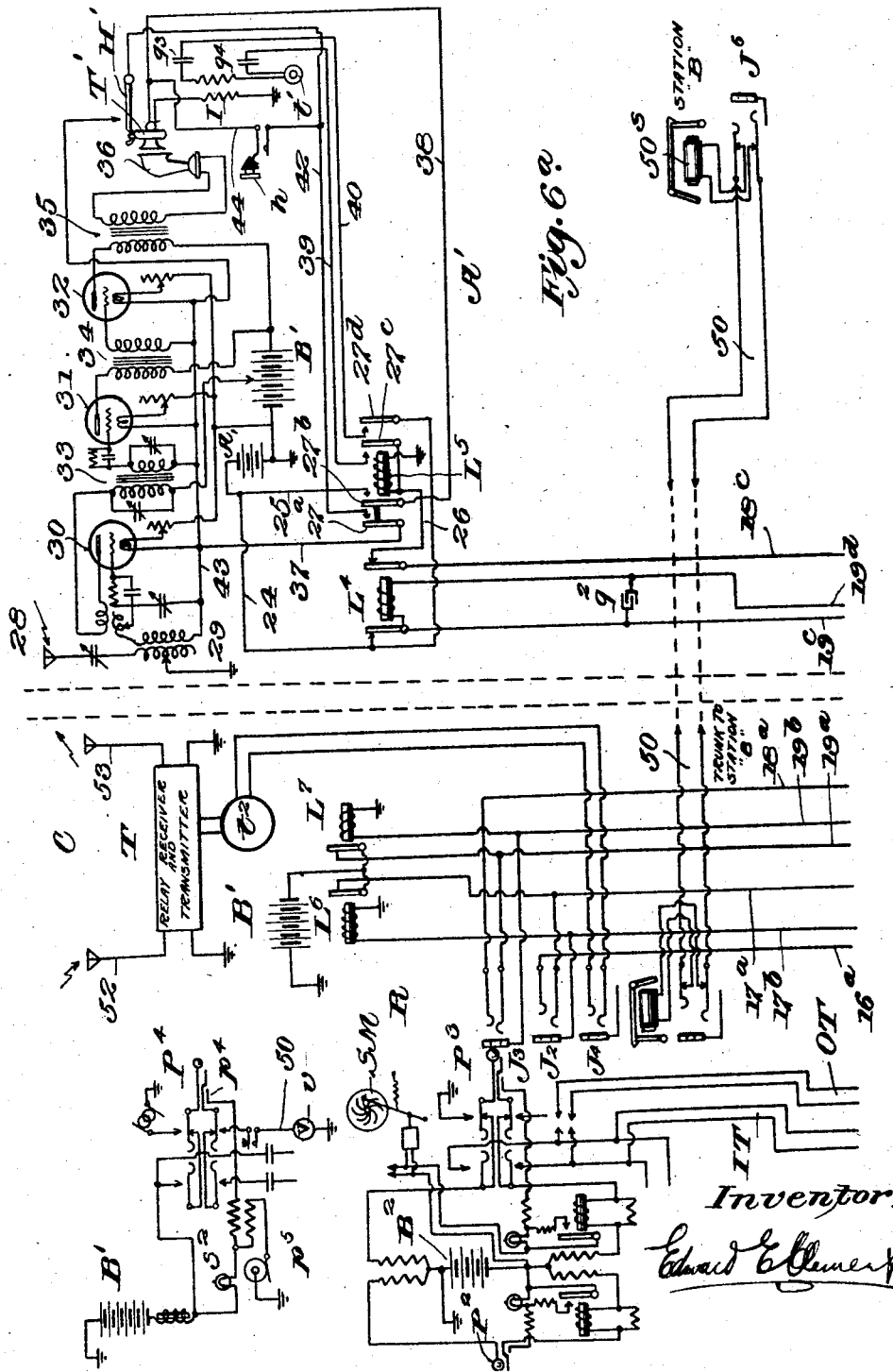

July 5, 1927.

E. E. CLEMENT 1,635,157

RADIO BROADCAST DISTRIBUTING SYSTEM

Original Filed Oct. 28, 1924     6 Sheets-Sheet 6

Inventor

Edward E. Clement

Patented July 5, 1927.

1,635,157

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

RADIO BROADCAST DISTRIBUTING SYSTEM.

Original application filed October 28, 1924, Serial No. 746,357. Divided and this application filed June 19, 1926. Serial No. 117,130.

My invention relates to systems of radio broadcast distribution, and the present application is a division of my prior copending application, Serial No. 746,357, filed October 28, 1924. This invention has for its object to provide an organization for the broadcasting of intelligence in which orderly distribution may be secured, with maximum efficiency. An important ancillary object is to gradually bring the entire radio distribution of intelligence under control without disturbance of commercial conditions which have been evolved during the rapid disorganized development of the art.

The system illustrated and described herein is based on the principle of successive aggregation, and is presented as one form of embodiment that satisfies the various conditions and meets the requirements above set forth. Very briefly stated, this system includes subdivision of the ultimate units or subscribers' stations into local groups in local areas, each group related to a local or regional distributing station; the grouping of these regional stations according to districts and relating each district group of regional stations to a district master station; the grouping of districts into divisions, which may conveniently coincide with the geographical standard time divisions of the country; and finally the relation of the district master stations to a central master station. There may be more intermediate steps or stations interposed between the subscribers' control or regional station and the central master station and there may be direct connection between the said regional stations and the central master station, but these possible variations will be apparent from the detailed description and do not change the principle involved. In any case, for purposes of distribution, the central master station broadcasts to the district master stations on divisional carrier wave frequencies, each of the district master stations broadcasts to its constituent regional central stations on a fixed carrier wave frequency, and each local or regional central station broadcasts to the subscribers in its local area on a common fixed carrier wave frequency.

The second characteristic feature of this system is that all subscribers are connected to their local telephone exchange centers by wire lines, these telephone centers either coinciding with or being closely related to the regional radio broadcasting stations C. For example, in a city having six branch telephone exchanges, one of these might be the radio station C for that area, and the other five connected thereto through telephone trunks. without themselves doing any radio transmitting, or they might all be C stations in the radio system, which would not require so much power. The subdivision herein described takes account of the inverse square law, and when properly applied, will greatly conserve power, while making receiving from any distance certain.

The combination of the two characteristic features thus outlined produces a very flexible system in which all communication outward from the central or master station through intermediate or B and C stations to the subscribers, is by means of radio carrier waves, supplemented if necessary by modulated high frequency carrier current transmission, particularly at the subscriber's end; and all transmission inward from the outlying or subscriber's part of the system to the C, B or A central stations is by wire, first by audio through the subscribers' lines to the C stations, where it is changed to superaudio or IF waves, then by trunk lines from the C stations to their respective district master B stations, then either directly by trunk from the district or B stations to the central master or A station, or for economy of trunk lines, from the district master or B stations in any one division through a selected B station and thence by wire trunk to the main central master station A. The number of wired trunks required in any link of the system, and the routing of the wire connections between telephone centers, will be determined in practice by traffic conditions, both telephone and radio. For example, in the case of a city area having six telephone exchanges, all interconnected by talking trunks, there may be one broadcasting station C, preferably located at one of the central stations, and in transmitting on the fixed frequency of its own subscribers, this station should be given access to any of the subscribers' telephone lines in the city. This of course can only be done by trunking to the various exchanges, using substantially the same methods that would be employed by a wire chief, to trunk through and select a subscriber's line. In the same way, in picking up matter to be broadcasted, it would come in over the subscriber's line to the nearest telephone exchange and would then be trunked to the local or regional broadcasting station C if for local broadcasting only, or here to be turned into IF frequency and be trunked on to the district master or B station if to be released for the entire district, or trunked on from there to the national master or A station if to be released for national broadcasting. As an example of the flexibility of the system, it is pointed out that matter can also be transmitted from and released for any desired part or parts of the system. Thus a subscriber or an artist through a local or regional center C can be trunked to the district station B for district release, and thence on to the master station A, and thereby released or relayed to any district station of the system; or from A the release may be by broadcasting to a particular division, thereby reaching all the B stations in that division and being relayed to all other C stations and to all other subscribers.

The reason for dividing the district stations into divisional groups is because of the change in time. Matters of great importance may be broadcasted simultaneously over the entire country, even though they would be received at a late afternoon hour in the Pacific standard division. For regular broadcasting of programs, however, matter originating above the B or district stations by this system can be distributed at intervals of one hour in the divisions from eastern, through central and mountain to the Pacific coast. In other words, as standard time in each of these divisions changes one hour in going west, the same program of national interest, would be distributed from A to the four divisions simultaneously, but with an hour's interval between the same items. In the case of news items, and many classes of entertainments this can be done without recording and reproducing, but in the case of other matters it will involve recording the items first broadcasted and repeating the same at an hour interval in the succeeding time divisions.

For purposes of this distribution, the four divisional groups of the exchanges are given four distinctive carrier wave frequencies. Simultaneous broadcasting on all four may be going on at the same time, and it goes without saying that the same items may be distributed on all four by simultaneous modulation on the four carrier waves. The A, B and C broadcasting stations will all be equipped with tunable antenna circuits and receiving devices by which they can pick up modulated carrier waves of any frequency, and by this means the B stations in any division may get original matter being broadcasted in another division, but as a matter of administrative efficiency, this should only be by permission. One very strong reason for making the time division is that efficiency of transmission increases behind the daylight line, and any attempt to average times, except on special occasions, must result in a loss of efficiency due to this cause. It is to be understood that the grouping in four divisions however is only adopted for convenience and may be varied as found convenient in practice. According to this classification, there would only be one long distance station in this system, viz, the A or master station; while the district or B stations need have an extreme range of only one-third that allotted for public broadcasting stations; and the C stations would be well below the class limits of private and toll stations. This means that great flexibility can be obtained by the use of a small number of wave lengths. Assuming four frequencies to be assigned to the four standard time divisions, respectively, four other carrier wave frequencies may be assigned to each division for transmission from B stations to C stations, and if desired still other four frequencies to the C stations for transmission to subscribers. Inasmuch as the same four frequencies could be used throughout the entire country for district and local broadcasting, this would mean twelve carrier wave frequencies in all. In using double modulation, however, the number of primary carrier wave frequencies for pure radio transmission may be reduced to four, viz: one common B frequency for receiving from A, one common C frequency for receiving from B and one common D or subscriber's frequency for receiving from C. In this case the initial broadcasting from station A to the four different divisions of the country would be on the same initial carrier wave frequency, modulated however with four different intermediate carrier wave frequencies, one of which is allotted to each of the four standard time divisions. In the same way the B or district stations may transmit to the C stations on the same initial carrier wave frequency, modulated with four intermediate carrier wave frequencies, which may or may not be the same as those transmitted from A. Similarly, the C station will transmit to the subscribers on one initial carrier wave frequency modulated with four or more intermediate carrier wave frequencies which are ultimately demodulated at the subscribers' stations to produce audio message. If the A station transmits to the four divisions on four groups of intermediate frequencies, each division would have its own group of intermediate frequencies and would always receive that, but by having separately tuned local long wave circuits, it could also receive the intermediate frequencies intended for the other divisions, and thereby achieve two ends, viz: first, afford its divisional C stations and their subscribers the opportunity of selection between all the matter that will be broadcasted or has been broadcasted during the preceding or succeeding one, two or three hours, as well as that intended for immediate broadcasting in its own division; and second, repeat programs or items in the programs when desired, so that subscribers who have not had an opportunity of hearing some particular item may pick it up on the first, second or third repetition. For important items this power is a very valuable one, and will probably always be exercised in practice, even though the repetitions of the particular items in the second, third and fourth divisions may be reproductions from records made at the time of the first transmission or broadcasting in the first division. Of course there is a reverse progression to be considered also, in that items forming part of the regular program for the Pacific Coast States, if to be heard in the same order in the eastern division or either of the intermediate divisions, would have to be either reproduced on the succeeding day, or produced in advance of their Pacific coast release, recorded and reproduced from the record in the coast division. As a matter of fact, the solution of this problem will probably lie in distributing a national program which will be varied in each division in passing through the B stations, to include matters of importance to that division only, and further modified in passing through the C stations (by authority from above) to include local items of special importance to the local areas.

In using the four frequencies referred to, recourse is had to the usual manner of "checker boarding", with one frequency allotted to each square in the checker board, no two adjacent squares having the same frequency. This is not perfect because of the diagonal connection between squares, which would require more than four frequencies to overcome but if the figure be considered as a hexagon, it would be found that the entire area can be divided up separately on four frequencies or four bands without interference.

The inherent function of the organized system hereindescribed for all matter originating at the master station A or distributed from there, is that of overcoming the losses due to the inverse square law, and delivering the modulated radio waves to the ultimate subscribers' receivers with approximately the same amount of energy as if they were situated wthin short range of the orignal or master distributing station. In other words, by this system of relaying by increased numbers and amplification, it is possible to maintain a sheet of waves bearing the same modulations over a very large territory at practically uniform strength for all receivers. The amount of amplification of each station would probably be in proportion to the square of its distance from the preceding station.

In order to insure perfect synchronism and phase identity throughout the transmitting or relay system at each stage, a master frequency can be transmitted from the main station to all intermediate stations, and harmonics of this may be taken and built up to furnish the fresh transmitting waves. See U. S. Letters Patent No. 1,403,835, to O. B. Blackwell, which describes the distribution of such a master wave for another purpose.

My invention is illustrated in the accompanying drawings, in which

Fig. 4 is a graphical diagram similar to Fig. 2, showing channels of distribution and lines of authority and control in a district.

Fig. 5 is a circuit diagram of the same district shown in Fig. 4.

Fig. 6 is a diagram of a telephone central station with two subscribers' stations connected to it and is intended to be read with Fig. 6ᵃ.

Fig. 6ᵃ is a continuation of Fig. 6, and shows a radio central station and a radio subscriber's station physically connected therewith through the telephone circuits of Fig. 6.

Figure 7:
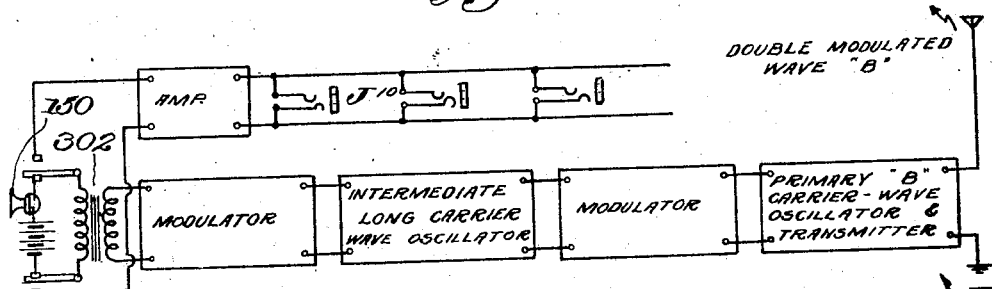

Fig. 7 shows symbolically an arrangement of double modulating and transmitting equipment at the A or master station of the system for matter originating there.

Figure 8:
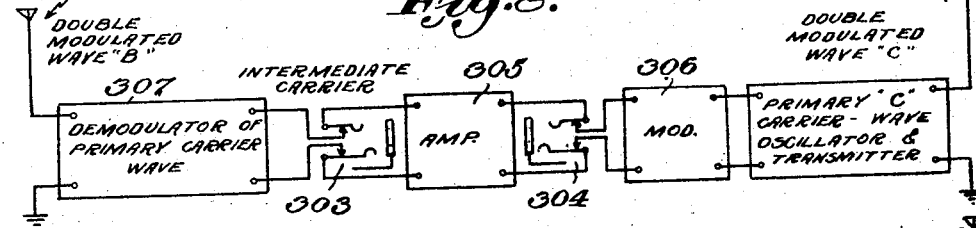

Fig. 8 shows symbolically equipment for the B stations, by means of which the primary carrier waves transmitted from the apparatus of Fig. 7 may be demodulated and the intermediate frequency waves or envelope modulated upon a new carrier wave C.

Figure 9:
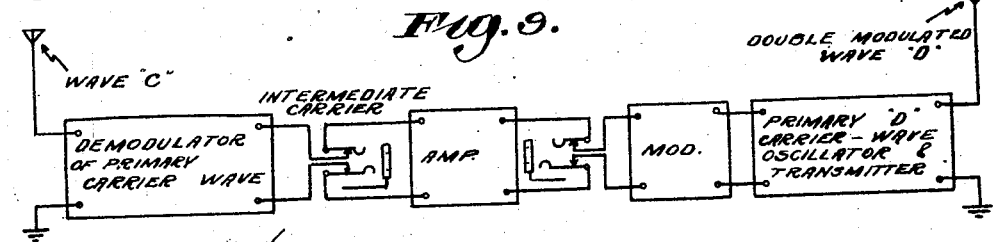

Fig. 9 shows symbolically apparatus similar to that in Fig. 8, but intended to be located at the local or regional distributing stations C, receiving, therefore, on the C wave frequency, transmitting on the D or subscriber's frequency.

Figure 10:
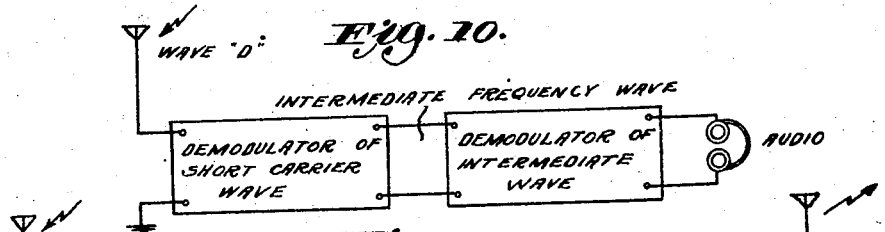

Fig. 10 shows symbolically a subscriber's set adapted to receive on the D frequency, to demodulate the short carrier wave, and then to demodulate the intermediate frequency carrier wave, so as to produce audio waves as its output.

Figure 11:
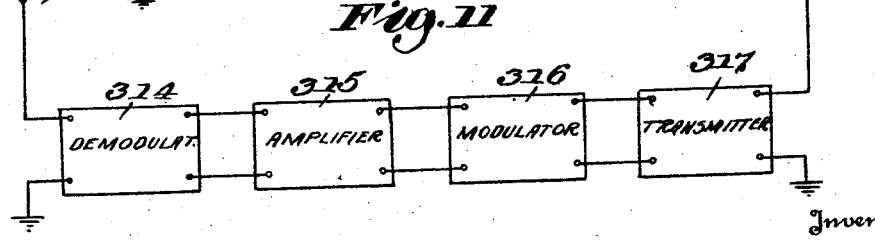

Fig. 11 is a symbolic diagram similar to Fig. 7 showing a modified form and arrangement which may be either substituted for or employed coincidentally with the apparatus of Fig. 7, to receive, demodulate down to audio frequency, amplify, remodulate on a different carrier wave, and retransmit, both the received and the transmitted carrier waves in this case being singly modulated, so that any ordinary receiving station may get the same.

Figure 1:
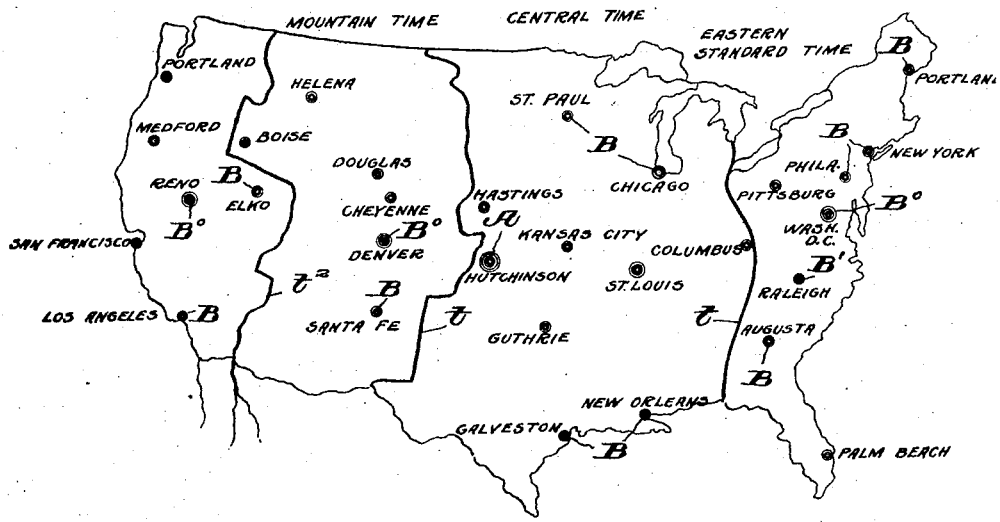
Fig. 1 is a geographical diagram of the area of the United States divided with respect to standard time, showing stations positioned to form part of a typical distributing system embodying this invention.

Referring to the drawings, and particularly to Fig. 1, this is a diagram of the United States of America, divided by lines $t$, $t'$ and $t^2$ into four divisions marked respectively "Eastern Standard Time", "Central Time", "Mountain Time", and "Pacific Coast Time". It happens that the town of Hutchinson, Kansas, is within fifty miles of the geographical center of the United States and hence I have shown this town with three rings around it, and the letter A, indicating the location either of the headquarters or master station of the entire system. In each division there is one station with two rings around it, and marked $B^0$. These are the head or master district stations of the several divisions, which under certain conditions serve as relay stations between the A stations and the other B stations for their respective divisions. Other stations are shown in each division with one ring each, and marked B. These are district stations, and receive either directly from the A stations or on occasion by relaying from the head or master B stations in their respective divisions. This illustrates the general manner of distribution, and will be referred to hereinafter.

In Fig. 1 I have shown eight district stations B in the eastern division, ten in the central division, and six each in the mountain and Pacific coast divisions, or a total of thirty. This of course is illustrative only and not to be taken as final either in positioning or numerical selection. As a matter of fact if the area of the United States be divided up into substantially equal districts, approximately one hundred district stations B would be a convenient number, but it is doubtful whether the traffic would require this many district stations at first.

As will presently appear, the programs in each division will vary, both in substance and in time of release, hence it is necessary to have some positive method of differentiating between the broadcast carrier wave intended for each division and those intended for the others. While this may be accomplished in several ways, I prefer at present to use carrier waves of distinctive frequencies, one for each division. In the present state of the art, these may advantageously be very short waves, of the order of 3000 kilocycles per second. The frequencies allotted to the B stations of the four divisions should be fixed and determinate, and known as division frequencies. Transmitting on these frequencies will ordinarily be from the A station, but under direction of the A station any B station may send on the B frequencies for special items or for relaying. If each division is thus given a distinctive frequency, four frequencies in all will have been allotted. Where single modulation is employed in transmitting from the B stations in their respective districts either for relaying matter received from A, or for original matter, non-interference can be secured in a number of ways. The simplest of these is to allot different carrier wave frequencies to adjacent districts, so that no two adjacent B districts may have the same frequency. To secure non-interference between adjacent local exchange areas C, these also can be allotted different wave lengths for adjacent local areas. By this checkerboarding arrangement, the system can be rendered flexible so that each district and each local C exchange can insert local matter in the broadcasting, without danger of overlapping. Assuming that this will require four frequencies for the B stations, four for the C stations and four for the D stations, a total of twelve frequencies would be required, which is well within the total number available, especially if very short waves are used for the primary transmission from A to B stations. It is to be understood that in merely distributing by relaying from A to B, from B to C, and from C to subscribers D, there could be no interference, as the same modulations originating at A would be repeated over the entire system. Also, it is to be understood that where different divisions or different districts or different local C stations are allotted different times on the program there can be no interference, even though the same carrier wave length be used for all of each order of stations.

Another method is to use double modulation with a plurality of intermediate frequencies modulated on the same carrier wave, so that selection of the modulated intermediate frequencies may be made, and so that at given times some or all of these intermediate frequencies may be employed for matter originating at B or C stations. For example, assume station A to broadcast to all stations B in all the divisions on the same short carrier wave. Assume that matters intended particularly for the eastern division are modulated on an intermediate wave of one frequency, those for the central division on an intermediate wave of a second frequency, those for the mountain division on a third intermediate frequency, and those for the Pacific coast division on a fourth intermediate frequency. The B stations would all be tuned as to their antenna circuits to the same carrier wave frequency, but their local circuits would be tuned selectively to the four different intermediate frequencies according to their location. Any B station in the central division would then take off the "Central" modulated intermediate frequency only, amplify and remodulate the same upon the C frequency for its district, and so on.

Reference will be made again to these methods of distribution after the apparatus and circuits shown in the drawings have been described in detail.

Figure 2:
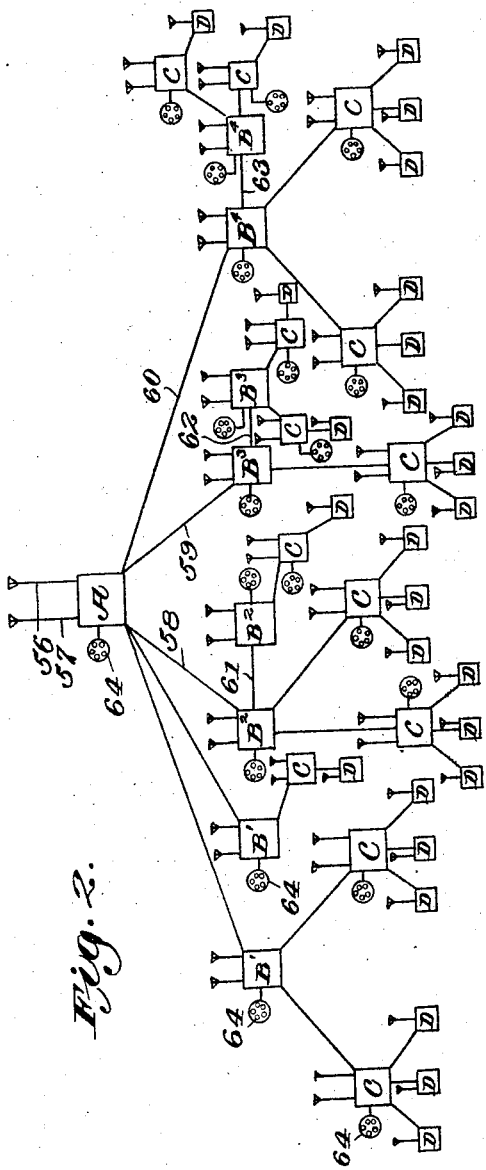
Fig. 2 is a graphical diagram showing the channels of distribution and lines of authority and control in the system of Fig. 1.

Referring to Fig. 2, the station A is shown connected by lines of distribution to district stations B', B², B³, and B⁴. The stations B' are in the eastern division, the stations B² in the central division, the stations B³ in the mountain division, and the stations B⁴ in the coast division. Each of these district stations is shown connected by lines of distribution to local distributing stations C in its district, and each of these local stations is shown connected to stations D typifying the ultimate subscribers' stations. The lines of distribution also represent telephone trunk lines from C stations to B stations C represent the subscribers' telephone lines which either terminate in stations C (if they are identical with telephone exchange stations), or are connected thereto, as indicated in Figures 6 and 6ª.

It will be noted that in Fig. 2 not all the stations B are connected to station A by direct individual trunk lines, but some district stations trunk through a district master station, thus economizing trunk lines. Thus, the trunks 58, 59, and 60 in Fig. 2 are shown extending to master district stations in the groups B², B³ and B⁴ respectively, other B stations in these district groups being connected to A through the respective master stations B by relatively short trunk lines 61, 62 and 63. The number and routing of trunks so used is of course variable, and may be accommodated to the necessities of telephone traffic so as not to interfere with the normal telephonic use of the wire plant, which is one of the cardinal points in the design of the present system. Details of district and local connections will be reserved for description in connection with Figs. 2 and 3.

Figure 3:
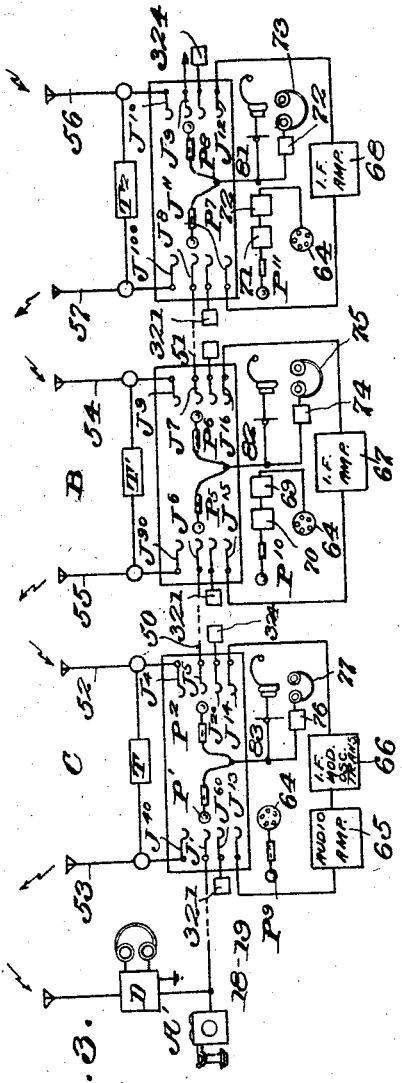
Fig. 3 is a circuit diagram of the same system shown in Figs. 1 and 2.

A better idea of the general arrangement of circuits symbolized in Fig. 2 is conveyed by Fig. 3, wherein a subscriber's line 18—19 (see Fig. 6) extends from his station D to the central telephone exchange C which is equipped with line jacks J', connecting plugs P—P' and trunk jacks J⁵. From the trunk jack J⁵, shown in the figure, a trunk line 50 extends to the district station B, which is also equipped with switchboard terminals including plugs P⁵—P⁶ and trunk jacks J⁶, J⁷. From the jack J⁷ shown in the figure a trunk 51 extends to the master station A where it terminates on a jack J⁸. The station is equipped with plugs P⁷—P⁸, and may be fully provided with telephone switching equipment, like the stations B and C. Details of such switching equipment are shown in Figs. 6 and 6ª, the parts being lettered the same in all figures. In Fig. 3, operators' telephone instruments are shown at O, connected in the usual manner to the cord circuit, and these symbolize a complete signaling and supervisory system. Each operator at stations B and A also has a demodulator and receiver for long IF waves, with suitable key for controlling the connection of the same to her cord circuits.

The radio equipment of station C includes a relay receiver and transmitter T with a local microphone and amplifier t² for local modulation. The antenna symbolized at 52 is supposed to receive waves set out from the B station of the district in which the particular station C happens to be located, and to which it is connected by means of the trunk line 50, which of course does not symbolize all telephone trunks but only such as may be allotted for the so-called radio traffic. The frequency to which the antenna circuit 52 is tuned in that allotted to the C stations and to which they are all normally or permanently tuned. The antenna circuit 53 is for radiating modulated carrier waves to the subscribers D in the particular local area surrounding and served by the station C under consideration. The frequency to which the antenna 53 is tuned is that allotted to the subscribers D, and to which they are all normally or permanently tuned. The details of the subscriber's station apparatus, including both telephone and radiophone are shown in Figs. 6 and 6ª, wherein a particular station of class D is designated as A', and will be described hereinafter.

Obviously, performances, or news, or other items of varied character which it is desired to broadcast either locally or over this entire system may be picked up in any part of the same, and since it would be impossible to bring all artists, to, or to originate all matter at, the station A, there must be provision for ingathering as well as for distribution, or, stated in another way, the system must be flexible enough to permit broadcasting from any part of it. It may be assumed therefor, without attempting to arbitrarily settle details of ultimate practice, that all studio and other connections for broadcasting, should initially be made through a C station. Theoretically any subscriber's station having a telephone transmitter may thus become a broadcasting station. Practically, while the subscribers' stations may be used as pickups, regular studio work will probably always be done either through PBX boards with special equipment, or in other special stations connected with a C central station. All of these may be taken as symbolized by the station D or A' in Fig. 3. It should be noted in passing that this allocation or original modulation to C stations does not interfere with direct broadcasting from A or B stations, since each of these can most conveniently be located at and operated in conjunction with a telephone central exchange which is also a C station or has a C station connected to it, as shown in Figs. 6 and 6$^a$. Thus in Fig. 2, I have shown a microphone transmitter 64 at every station of the orders A, B, and C, to indicate that broadcasting may be originated thereat when required. The actual manner in which this is now intended to be done is shown in Fig. 3. The symbolic station C is provided with a pair of jacks $J^{13}$ and $J^{14}$ between which are connected the audio amplifier 65 and the intermediate frequency modulator and oscillator transmitter 66. The jacks $J^{13}$ and $J^{14}$ may be connected through the operators' cords and plugs with the line jack J' on the one hand and with either one of the jacks $J^4$ or $J^5$ on the other. If jacks $J^8$ and $J^{13}$ are plugged together and jacks $J^4$ and $J^{14}$ are plugged together, then the operation would be as follows: Assuming the subscriber A' to transmit sound waves electrically over his line 18—19, these waves pass into the audio amplifier 65 and thence into the modulator 66, whereby a modulated intermediate frequency carrier wave is communicated to the input side of the relay transmitter T, which in turn modulates the long wave thus produced upon the short carrier wave allotted to stations D, and radiates the same from the antenna 53. Thus the station C is broadcasting on the common frequency wave, using an intermediate frequency which the subscribers can receive by double demodulation, in a manner to be presently described.

Now assume that instead of jacks $J^4$ and $J^{14}$ being plugged up together, the jacks $J^5$ and $J^{14}$ are so connected. The result will be as follows: The audio waves over line 18—19 pass to the audio amplifier 65 and thence to the modulator and oscillator transmitter 66, by means of which an audio modulated intermediate frequency carrier current is transmitted over the trunk line 50 to the station B. At this station an arrangement of jacks is encountered similar to that at station C. Jacks $J^{15}$ and $J^{16}$ have connected between them an intermediate frequency or carrier amplifier 67 which may be plugged up either for broadcasting from the antenna 55, or for continued transmission over the trunk 51 to the station A.

To produce the first result, jacks $J^6$ and $J^{15}$ are plugged together and jacks $J^9$ and $J^{16}$ are plugged together, whereupon the carrier current or intermediate frequency carrier waves will be communicated to the input circuit of the oscillator transmitter B and thereby modulated on a high frequency carrier wave radiated from the antenna 55, at standard C frequency. This wave will be received and may be relayed by all the C stations within range of the transmitting station B. If wider distribution be desired the jack $J^{16}$ is plugged onto the jack $J^7$ of the trunk line 51, and the amplified or relayed intermediate frequency carrier waves are transmitted to the station A. Here the arrangement of the intermediate amplifier 68 between the jacks $J^{11}$ and $J^{12}$ is the same as that of the amplifier 67 at station B. By plugging up the jack $J^{12}$ to the jack $J^{10}$, the amplified intermediate frequency waves will be communicated to the input side of the oscillator transmitter $T^2$ and thereby modulated on a short carrier wave and radiated from the antenna 57. As this wave has a frequency allotted to the B stations, all the B stations will receive it, and may in turn relay it to the C stations and they in turn relay it to their subscribers. One reason for the rule that all broadcast matters shall originate at or through a C station will now be apparent, viz, that the initial audio or telephone waves may be changed as near as possible to the point of origin to modulated intermediate frequency carrier waves, which may then be imposed as modulations on a radiated carrier, or on a wire circuit, with equal efficiency. Audio waves in a wire circuit are subject to attenuation and distortion to a greater degree than modulated superaudio frequency carrier waves. Also, by using superaudio frequency currents on the trunk lines, advantages can be taken of the well established systems of multiplexing and relaying already in use, and the trunks rendered more productive without interfering with their telephonic use. Thus, the initial audio waves are always changed into modulated superaudio waves at the nearest central station, and thence dispatched either on a carrier wave radiated from an antenna, or on a trunk wire to some other point where they are so dispatched. In order to add still further to the flexibility of the system, the A station at the right of Figure 1$^{aa}$ may trunk as from a jack or jacks $J^{12}$ through a trunk or trunks designated as X to any other part of the system, as for example to a particular B station, where the trunk X may terminate on a jack similar to $J^6$, for connection to radio transmitter T', or by further trunking to some particular C station, and so to the radio transmitter T at such station, whereby matter can be picked up at any point and broadcast either generally or in a selected district or in a selected local area only. It follows also from this arrangement that when radio transmission is difficult over long distances or in any particular section of the system, due to seasonal or diurnal or non-periodic phenomena, the distribution by wire can be made to supplement distirbution by pure radio and the average of efficiency maintained throughout the system. To accomplish this every part of the system must cooperate perfectly with all other parts as determined by the master control station A and district master control stations B, B', etc. both in time of transmission and maintenance of clear transmission channels.

Again referring to Fig. 3, it will be observed that station C as well as stations A and B are indicated as having originating modulators (shown as microphones) 64, which may be plugged onto either the input side of the respective radio broadcast transmitters T, T', and T², or the respective trunks 50, 51, and $x$. At station C the modulating audio transmitter can be operatively connected to either jack $J^4$ or $J^5$ by inserting plug $P^9$ in the jack $J^{13}$ of the amplifier 65 and long wave modulator and oscillator 66, and then plugging jack $J^{14}$ to either of the other jacks at will. The parts 65 and 66 are here made separate units because they are common to all subscribers' lines as well as the operator's microphone circuit. At station B the operator's microphone is connected to plug $P^{10}$ through amplifier 69 and long wave modulator and oscillator transmitter 70; and at station A the operator's microphone 64 is connected to plug $P^{11}$ through amplifier 71 and modulator and oscillator transmitter 72. At station B the trunks 50 bring in modulated intermediate frequency (IF) waves or carrier current, and in passing this to either transmitter T' or trunk wire 51, only amplification is needed, which is supplied by unit 67, which may be a vacuum tube relay as well as amplifier unit. Similarly at station A the trunks 51 from B stations bring in carrier current or (IF) waves and the relay and amplifier unit 68 is provided accordingly. Finally, to enable full supervision as well as reception of audio at each station A, B, and C, the operators' circuits are indicated as provided with demodulators 72, 74, and 76, and receiving telephones 73, 75, and 77 respectively. These are supposed to be connected to the cords through listening keys 78, 79, and 80, respectively, which may also control the connection of ordinary operators' telephones 81, 82, and 83, respectively, for telephone conversation over cords, trunks and lines as usual.

Referring now to Figs. 4 and 5, I have shown therein the method of distribution in the district or B areas. In Fig. 2 this is indicated geographically, as to the relation in general between B and C stations; and in Fig. 4, the lines of authority and distribution are shown, somewhat more in detail than in Fig. 2, but employing the same principle. In Fig. 4, the B station has receiving and sending antenna 54 and 55 and is connected by wire trunks 50 and 50ª to local distributing or exchange stations C. The station C on the left side of the figure has connected to it by wire trunks two other C or central stations, both being branch exchanges depending upon trunking connection with the main station C for their cooperative functioning in the system. One of these, marked C' is a local branch exchange in the same city or local area as the exchange C, and has no antenna, since its subscribers D can receive directly from the broadcasting station at the main exchange C; but as the functions of battery supply, metering, supervision, trunking and ingathering of material are all performed at the terminal points of the local subscribers' lines, the equipment for these purposes is the same at the branch exchange C' as at the exchange station C in Fig. 1ªª, omitting only the radio transmitter T. Thus, in a city or other local area served by a plurality of telephone exchanges, there need be but one radio broadcasting or C station, which reaches the branch exchanges and subscribers telephonically over wired trunks and vice versa.

The station C² in Fig. 4 is supposed to be a PBX or private branch exchange. Here the exchange has the antenna, receives the radio broadcast waves from C, and after demodulating the short carrier wave, sends the modulated IF waves to the subscribers over their wire lines. In this case the subscribers, instruments need not be double demodulators, but may be single detector instruments of ordinary type. The wire communication between the subscribers and the PBX, C² and between the C² and the station C, is the same as before for all purposes. As there are very many branch exchanges and PBX exchanges in the telephone systems, especially in large cities, these modified arrangements are of importance.

On the right hand side of Fig. 4 are shown another branch exchange C', and a party line C³ leading out of exchange C. This party line has three subscribers connected to it, and by means presently to be described more in detail, they can be supplied collectively with the broadcast waves. Station C has a radiating transmitter, and the stations D on line C³ have receiving antennas, but they may also be fed over the line itself. To differentiate between the subscribers' stations different intermediate frequencies or different carrier waves may be employed at C stations as will be presently described.

Referring to Fig. 5, the arrangement of trunks as shown to be substantially the same as in Fig. 3, the difference being in the method of subdivision.

It will be understood that Figs. 2 and 4 are merely outlines or skeleton diagrams, in which the metallic line and trunk circuits with all their minutiæ of line and cut off relays, etc., are represented by single lines, and the subscribers' and central office apparatus is all indicated by elementary symbols; but are intended to represent fully developed and equipped standard lines and stations, as shown for example in Figs. 6 and 6ª. It may also be noted here that for simplicity of description and illustration I have purposely shown manual rather than automatic telephone switching apparatus at the exchange centers, but for the attainment of every purpose and the performance of every function in my system which is herein shown attained or performed by manual apparatus, I contemplate as well the use of the corresponding automatic apparatus, as will be further explained hereinafter.

Referring to Figs. 6 and 6ª, I have therein shown circuits of the central office and substation equipments and connections, Fig. 6 representing the telephone side of the system, and Fig. 6ª the radiophone side of the system. Before proceeding to detail description it may be noted that in accordance with standard telephone practice, provision is made for keeping the telephone lines and central office circuits clear of all grounds or other disturbing connections during conversation. When the radiophone goes into service, by closing the filament switch its operation in receiving is identical with that of any radio receiver, and in the event that use is made of any transmission of waves over the line wires, as will be hereinafter pointed out, said transmission will be at a frequency above the limits of audition. In the present diagram, I have shown the circuits arranged with nothing but continuous current for radio purposes over the telephone line wires. This is the simplest form of control and the one nearest to present-day telephone practice, and is absolutely certain not to produce any disturbance in adjacent conductors in the telephone cables. Each radiophone set is provided with a cut off relay energized when the telephone set goes into commission, either by calling or being called, and at the central office whenever the radio operator takes control of the line, he disables it in the usual manner by pulling up the cut off relay at the telephone switchboard, this however being subject to the condition that a special tone test may be put on the radio board, and subject to interruption for telephone connection. I prefer to use this tone test only with the radio operator's testing plug, because his regular connecting plug includes within its functions that of connecting a subscriber through the station amplifier to the broadcasting transmitting set, and a connection of this character should not be interrupted without permission.

Referring now to the diagrams, Fig. 6, A and A' are two subscribers' stations connected by line wires 16—17 and 18—19 respectively to the central station C where they terminate on jacks J and J'. P—P' are plugs forming the terminals of a cord circuit 20—21, 22—23, having a bridged repeating coil I, ringing and listening keys K and K', supervisory signals $s$—$s'$ and bridging connection to the main battery B. The same battery is shown supplying current to the line relays L, L', and through contacts at the cut off relays $L^2$, $L^3$ to the respective lines for calling purposes. In this system, when a subscriber takes down his receiver, the line relay lights its lamp, which is extinguished when the operator inserts the answering plug. Battery supply for the connected lines is thereafter taken through the cord circuit 20—22, 21—23, in a manner well understood in the art. When the substation telephones are out of service, with their receivers hanging on their hooks, the line circuits are conductively open for direct current, leaving the ringers Q and Q' in circuit for alternating ringing current passing through the condensers $q$—$q'$.

Referring now to Fig. 6ª, it will be observed that the radio switchboard which I have designated generally by the letter R, is connected to the subscribers' lines by multiple taps marked 16ª, 17ª, and 17ᵇ, and 18ª, 19ª, 19ᵇ. These terminate on multiple jacks $J^2$, $J^3$, corresponding to the multiple jacks on the telephone switchboard. It should be noted that throughout this system the tip wires 16 and 18 with their branches are connected to ground, while the sleeve wires 17 and 19 and their branches, are connected to battery. This is extended into the radio side of the system for the purpose of securing proper balance between the main battery or power plant of that side and the main battery or power plant of the telephone side of the system.

At the subscribers' stations taps are also taken off from the telephone terminals to the radiophone terminals as indicated at 18ᶜ, 19ᶜ, and 19ᵈ. (The radiophone is shown only at one substation for sake of simplicity of illustration.) The two branches 19ᶜ and 19ᵈ are taken from the sleeve or battery side of the line 19, and are connected to opposite terminals of the winding of a relay $L^4$, which constitutes the substation cut off relay for the radiophone. The winding of this relay is bridged by a condenser $q^2$ through which both ringing and voice currents can pass without substantial impedance. Where the radiophone is attached to a party line substation, this relay $L^4$ may be omitted, since on such party lines there are usually grounds on one side or the other. As will presently appear, the radio circuits described herein are applicable to two-party and four-party lines, with individual metering of the party stations.

Normally, that is to say, when the telephone circuit is not in use, the cut off relay $L^4$ is deenergized and as a consequence the wire $19^c$ is connected through a back contact of the relay through extension wire 24 to the branch 25 connected to the "A" battery marked $A_1$ in Fig. $3^a$. The wire $18^c$ similarly passes through a back contact of the relay to the extension wire 26 leading to test or listening relay 27 and ground. $18^c$, it will be remembered, leads to the tip or ground side of the line, therefore it is the side which in the radiophone can be made use of with a permanent ground or grounds, without disturbing the balance of the telephone circuit.

The radiophone receiver at the substation A' is shown as comprising an antenna 28, tuned coupler 29, first detector tube 30, tuned filter coupler 33, second detector 31, audio amplifier tube 32, and audio transformers 34, 35, the last mentioned transmitting the amplified audio waves to the telephone receiver or loud speaker 36. The filament battery is $A_1$. The plate battery is $B_1$ and suitable tuning condensers and coils, tickler coil for regenerative effects, etc., are provided as required. I should remark in passing that this representation of the radio receiver is intended to be typical only.

The relay $L^5$ has four pairs of contacts, one pair $27^a$ closing the wires 25 and 37 from battery $A_1$ to the filaments. The second pair $27^b$ closes the wires 25 and 38 so as to put battery $A_1$ on the telephone transmitter T', and through the induction coil I', to ground. The third and fourth pairs of contacts $27^c$, $27^d$, close the wires 39 and 40, forming terminals of the secondary induction coil circuit I', to the tip and sleeve side of the telephone line respectively, through the back contacts of relay $L^4$. The transmitter T' is shown hanging upon a hook switch H' controlling the connection of wires 41 and 42, constituting a parallel link between the battery $A_1$ and the filament bus 43. Thus the filament can be heated and the radiophone put in service either through the agency of the relay $L^5$, or by the switchhook H'. The former is controlled by the radio operator at central, and the latter by the subscriber at the substation. In addition to the hook, the subscriber has a manual switch $h$ by which he can connect the battery wire 42 through a wire 44 to his transmitter T', coil and ground, so as to energize his talking circuit. I provide an ordinary telephone receiver $t'$ in series with the secondary of the induction coil I', and I interpose a pair of condensers $q^3$, $q^4$ between the secondary of the induction coil I', and the receiver $t'$ on the one hand, and the terminals of relay $L^5$ on the other, so that while the subscriber by means of switch $h$ can connect his phone T'—$t'$ for receiving calls over the telephone line, he cannot originate telephone calls thereover from the radiophone extension. This is subject to modification by omitting the condensers if desired to originate calls.

Returning now to the central station, and particularly to the radio department thereof shown in Fig. $6^a$, T represents a broadcasting transmitter, symbolized in very simple form, but supposed to contain the usual elements of power supply, modulator, oscillator and aerial, with suitable amplification of the audio waves supplied on the input side. The jack $J^4$ connected to the amplifier $t^2$ and thence to the transmitter T. symbolizes a group of such jacks or equivalent connecting means such as automatic switches, controlled by dials or keys for connecting any of the wire lines to said radio transmitter. Detailed appliances, both for the switching and for the radio transmission, are well known in the art, and need no specific description, my present invention having to do particularly with the method of transmitting by wave radiation to the substations, and of bringing in all conversation originating or received at the substation radiophone over the subscriber's wire line. This includes repetition of modulated radio waves received at the radiophone substation and also originating messages gathered up and to be put through the amplifier $t^2$ on the transmitter T for broadcasting.

It may be explained here that the transmitter T for general purposes is assumed to be the standard carrier wave length transmitter for the local exchange area, to which all of the substations are tuned and upon which they depend both for original messages and programs and for those received and relayed from a distance. There are special cases, however, in which certain groups of radiophone subscribers may desire intercommunication among themselves, and I contemplate therefore the installation of duplicate modulators and amplifiers, or complete duplicates of this transmitter, which may be connected up for group use. For example, a chess club desiring to meet, arranges a program, and at the appointed time its members attend at their radiophones, all removing their transmitters T' from their hooks, while the radio operator at the central station plugs up the multiples of their respective lines through their jacks $J^2$—$J^3$, and connects them on to a broadcasting transmitter of the type T. This plugging up may be carried out in any desired manner, there being several ways well known in the art for thus connecting telephone lines together. The radio operator then supervises the operation, since any one of the connected subscribers may be speaking through the broadcasting transmitters to the others, and it is necessary to prevent interruption. The same might be said of any meeting of a group of people held in this manner, the most valuable feature of this part of the invention being the absolute control afforded over the transmitted messages. The connection to the broadcasting transmitter is solely within the control of the radio operator at the jack $J^4$ or any other suitable form of switch, and he has it in his power therefore to cut off connection at any time. This will be referred to again hereinafter.

The cord circuit between plugs $P^2$ and $P^3$ in Fig. $6^a$ is the same as the operator's cord circuit in Fig. 6, but the radio operator also has special test cords such as that shown in the upper part of the figure connected to plug $P^4$. Here the keys K—K' are of standard construction, as in the other cords, and the test contact of the plug $P^4$ is connected through suitable resistance to the supervisory lamp $s^2$ to the radio battery $B'$, means such as the commutator $p^5$ being provided to give special tone test on the test thimbles of the multiple jacks J, J', $J^2$, etc. It will be observed that the constant connection of the sleeve or battery $A_1$, produces charging of that battery by the constant flow of current therethrough from the main radio battery $B'$ at the central office. The amount of energy thus delivered to the battery $A_1$ depends upon the size of the line wires, and the length of time available for such charging. As shown, the battery wire 24 is not cut off except when the cut off relay $L^4$ pulls up which is only when the line wire is in use for conversation.

Referring now to Figs. 7 and 10 inclusive, I have therein shown the arrangement of receiving and transmitting apparatus at the stations A, B, C, and D of Figs. 1, 2, $1^a$, $1^{aa}$. Turning to Fig. 7, I have shown therein an arrangement of originating broadcast transmitters at the head or master station A. The purpose is double modulation, by first modulating by means of a telephone transmitter upon a long wave, and then modulating the long wave upon a short carrier wave of suitable frequency to be received at the stations B. It goes without saying, that this same arrangement of apparatus will be found at each of the other central stations B and C, being indicated in Fig. 3 by the numeral 64. In order that this apparatus may also be employed for radio broadcasting of material brought into the stations over wired trunks, I show a jack $J^{10}$ (see right hand end of Fig. $1^{aa}$) connected through an amplifier to switch contacts which may be connected through amplifier switch arms to the primary of the transmitter induction coil 302, the secondary of which is connected to the modulator of the generating and transmitting set. Thus a trunk line or even a subscriber's wire may be plugged on to the modulator through the amplifier by means of jack $J^{10}$.

Fig. 8 shows a relay apparatus primarily intended for use at stations B, but which will also be used at master station A. Fig. 9 shows identical apparatus for use at the C stations.

The function of the apparatus of Fig. 8 is to take double modulated waves at the frequency allotted to the receiving station, demodulate the short wave carrier so as to produce modulated intermediate frequency waves which are then passed through a tuned amplifier 305 to a modulator 306, by means of which they are modulated on a primary or short wave carrier of a frequency suitable for the next lower order of receiving stations, in this case C stations. The short waves thus modulated are then radiated.

By means of the jack 303, intermediate frequency or long waves modulated may be taken off a trunk and passed through the amplifier 305 to the modulator 306 and thence radiated as before. Also, by means of the jack 304 intermediate frequency or long waves modulated which have passed through the demodulator 307 and the amplifier 305 may be forthwith placed upon the wire trunk lines for transmission to other stations. These extensions should be available at each stage in the system, and I consider it original with me to provide means for affecting these combinations of super-audio frequency modulated waves transmitted either from wires to radio carrier or from radio carrier to wires without change either in the intermediate frequency waves or in their modulations, and shall claim the same accordingly. This is one essential feature of the present system, which it is believed should be adhered to in any system of organized broadcasting; i. e. that when an original modulation is once made, the wave train carrying that modulation should be preserved unchanged throughout its entire course from point of origin to the listener's ears. As described herein, I accomplish this by means of double modulation, with super-audio modulated waves modulated upon the high frequency radio carrier. I shall presently show that single modulated waves can be received and relayed with the same ultimate effect. I consider, however, that the method of double modulation is the best and most perfect for this purpose.

Referring to Fig. 10, this shows typically a subscriber's apparatus for taking double modulated waves sent out from the stations of any of the preceding three figures, and demodulating the same so as to recover the original audio modulations and make them apparent. There are two units, one a demodulator of the short carrier wave, which produces the long intermediate frequency wave carrying the original audio modulations, and passes these to the second demodulator, which demodulates the intermediate waves and passes the audio waves to the telephone receiver shown at the right of the figure. This method is shown in detail in Fig. 6ª at the subscriber's station, where the circuit arrangement of such a double demodulator is illustrated in full.

In order that the organization of stations illustrated in Figs. 1 to 10 may not be understood as dependent entirely upon double modulation, I show in Fig. 11 a schematic diagram of apparatus for stations A, B or C, employing single modulated carrier waves throughout. In relaying such waves, they are first demodulated at 314, then the modulations pass through an audio amplifier 315, and by means of a modulator 316 are imposed as single modulations upon a carrier wave produced and radiated by the transmitter 317.

The apparatus shown in Figs. 8 and 9 is intended to receive a double modulated carrier wave such as that radiated from the antenna in Fig. 5ª, demodulate the same and reimpose the long wave or intermediate frequency, with its modulations, upon another short wave carrier which in the apparatus of Fig. 5ᵇ is supposed to be the carrier wave of a frequency allocated to stations C, while in the apparatus of Fig. 9, this is supposed to be the carrier wave of a frequency allocated to the subscriber's stations D. Glancing at the four figures, 7, 8, 9 and 10, it will be observed that from the original modulation due to the transmitter 150 to the final demodulation by the intermediate wave demodulator in Fig. 10, the same intermediate long wave carrier, and the same audio modulations thereof, are maintained intact and unmodified, being merely passed along by relaying from station to station on short carrier waves, or as hereinbefore described on wired trunk lines as the equivalent of the carrier waves.

The apparatus in Fig. 8 and that in Fig. 9 is identical except for the tuning of the transmitted carrier wave. The description of one therefore will suffice for both.

The general operation of the system thus described will now be understood. The main underlying idea is that of a mixed wire and radio system organized so that the characteristic properties of each of these elements are utilized in the combination to the best advantage, and defects and disadvantages of either are eliminated. According to the principle laid down in my prior patent Reissue No. 16,231, pure radio transmission is used for the broadcasting from center to scattered units, and wire transmission from units to center; but this is expanded by successive steps of relay distribution outward, and selection inward, so as to cover a large area such as that of the United States, in which not only are successive steps in distribution necessary, but divisions of the territory according to time become important.

The master or A station, which is preferably equipped with all of the apparatus indicated in Figs. 7, 8, 9, 10 and 11 broadcasts items as follows: (a) received from abroad or from outside stations; (b) received from any part of the system by prearrangement and routed as hereinbefore described through C and B stations; (c) originating at A; (d) received from points in the systems as "specials", for either general or limited distribution. For purposes of (a) the apparatus of Fig. 7 or 11 would ordinarily be employed, items received by wire being regarded as within the system. For the purposes of (b) the apparatus of Figs. 8 or 9 would be employed. Ordinarily, items collected through the system would come into A over the wire trunks and would be passed through to the jack $J^{10}$ and thence through the amplifier, modulator and oscillator to be radiated. This radiation would be in waves of B frequency, and without other distinctions would be picked up by all the B stations, or at least the head B stations, for relaying, as by their apparatus shown in Fig. 8, to the C stations and thence by means of their relay apparatus such as that shown in Fig. 9, to the subscribers. In practice there will be a division of such broadcasting, as to items of importance, so as to give them their proper time of distribution in the several divisions of the territory. The principal methods for this would be to repeat such items or numbers at intervals one hour apart, or if two divisions are served at once, two hours apart. This would mean a compromise between the eastern division and the central division as to the time of transmission, making half hour changes instead of one hour changes; and the same between the mountain and Pacific coast divisions.

As a matter of expediency, the compromise method of regulating the time of a performance of any kind so that it may be broadcasted in all the divisions simultaneously will probably be practiced until the public has become accustomed to an organized system. It is not in keeping with the spirit of this system however, except in matters of first class importance to the nation at large, to permit deviation from regular order of programs. In order to avoid this, and at the same time permit those who desire to hear the program or item in question when originally rendered, it will be broadcasted once directly from the performer or instrument, this being done at such a time that reproductions can be used for broadcasting in other divisions in order of their clock times. This would mean that grand opera booked as an item by the radio broadcasting company, but given in San Francisco, might be performed at 5 o'clock Pacific coast time, which would be 8 o'clock in the eastern division, 7 in the central, and 6 in the mountain division. B stations in the three eastern divisions as well as the coast division would have this on their daily dispatch sheets for release by relaying at the actual time of performance.

The foregoing description, while addressed primarily to broadcasting from station A, includes items drawn from different parts of the system, which implies transmission through B stations from C stations, either by wire or by radio. In the latter case, for direct transmission and broadcasting the station A would become in effect a relay station, as well as a recording and repeating station.

(c) matters originating at station A are handled by means of the apparatus of Fig. 7 but may also be handled by plugging the transmitter 64 (Fig. 3) with its amplifier 72 and intermediate frequency modulator and oscillator 71 onto a trunk or trunks 51 leading to B stations, from which the actual broadcasting can be done by connecting trunks to their intermediate wave amplifiers and the modulators and oscillators of their short carrier waves. In other words, the station A can either broadcast direct or by wire trunking through the B stations, preferably the head B station of each division. It is further to be noted that the A station when so working over wire trunks can receive the same waves radiated from B on antenna 56 (Fig. 2) and by demodulating and listening to the audio frequency component thereof can determine the efficiency of transmission and the tuning of the B apparatus with respect to the short carrier wave employed.

Each station B is supposed to be a district station, that is, it compiles and checks up all bookings or "regular number" items in its district, keeps the A station informed thereof, makes up district programs, supervises local or C program including items to be recorded and released later, receives, records and forwards traffic reports and charges from its district to A and acts as a relay station for mixed wire and radio transmission between the C stations in its district and the rest of the system.

For listening in and supervising reception by the subscribers, the radio station C makes use of the apparatus shown in Fig. 6ª, whereby the waves radiated from the transmitting station may be caused to return after demodulation over the wires so as to be audible to the operator through a proper listening apparatus. The apparatus of Fig. 6ª also includes elements such as V, P⁴, etc., for testing the subscriber's line and instrument. If local batteries are employed at the subscribers' stations, their condition and voltage can be ascertained and if all current is supplied from central as in my prior applications, Serial Number 699,023, filed March 13, 1924, and Serial Number 722,993, filed June 28, 1924, then the resistance of the circuits and their proper tuning can be determined.

For connecting subscribers' wires or studio wires to trunk lines for direct or telephonic communication the radio operator has cord circuits and terminals of the lines, symbolized at P², J³, J², etc., in Fig. 6ª and may have equivalent automatic or semiautomatic switching apparatus. The operation is symbolized in Fig. 3, which shows jacks J' and J⁵ by means of which the subscriber A' can be trunked to any part of the system without going through the telephone switchboard. I have shown the subscriber's radio receiving set in Fig. 6ª as provided with an extension telephone T'—t', and by means of these and the separate switching apparatus under control of the radio operators it is to be understood that all radio operations, including incidentally telephone trunking or interconnection between radio subscribers can be handled by the radio switchboard, without access to the telephone switchboard or the telephone operators, (except in cases where the same switchboard is employed for both classes of service). I believe this to be original with me and shall claim the same accordingly. The typical and preferred mode of trunking by wire in this system, however, is by means of modulated superaudio frequency carrier current which can be interchangeably imposed on the wired circuits or upon suitable radio frequency carrier waves so as to render transmission and interchange over and between the elements of the mixed system both simple and flexible. This is accomplished by first of all modulating the secondary intermediate frequency in accordance with the sounds which it is desired to transmit; and then sending this modulated carrier current over the trunk circuit or circuits to the point where it is to be utilized. It is to be understood that in such wired transmission of relatively high or superaudio frequencies, the line and trunk circuits are appropriately tuned. It is also to be understood that when transmitted over long trunks, the carrier currents may be relayed and amplified and may be passed through filter circuits when required, all according to principles which are well understood in the art, and which have not been illustrated herein as they form no part of the present invention. Thus, for example, in assuming a trunk connection from the head B stations in Fig. 1 to the master station A, it is taken for granted that the wire trunk lines employed for this purpose may be multiplexed and provided with tube relays and amplifiers, the same as at present. If more than one intermediate frequency is assigned to the radio broadcasting corporation for use on wired trunk lines, all such frequencies of carrier current might be confined by agreement to the same trunk or trunks, or if a more flexible agreement were possible, it might be applied over any trunks in the system. This is a detail of administration to be worked out and agreed upon between the telephone company and the broadcasting company; but the principles involved of having certain frequencies or bands of frequencies which can be separately allotted for radio uses only over a system of wired trunk lines, I believe to be original with me and shall claim the same accordingly. This is not to be confused with telephone trunking broadly, even though it be employed for transmitting sounds from a distance to a radio broadcasting studio. The combination I present is more flexible than that, and at the same time more comprehensive, because it includes all the elements of an organized system, whereby modulated intermediate carriers may be forwarded either by means of wires or by means of double modulated carrier waves, from any point in the system to any other point in the system, without losses or distortion due to changes in frequency or tuning. It will be remembered that for receiving purposes the instruments at subscribers' stations are all supposed to be standardized and tuned to one fixed frequency. (This of course is subject to distribution of carrier wave frequencies as expediency may determine and as recommended by the Government. For general purposes it may be assumed here that all subscribers' instruments are tuned fixedly for the same primary carrier wave frequency.) In passing through the relay stations however, the primary carrier wave frequencies change from A to B, from B to C, and from C to subscribers D. Thus, if the sending station B should vary the frequency of the C carrier wave transmitted, this would not affect the intermediate wave frequency or the audio modulations, and so long as C uses the proper frequency D, for the subscribers, the original intermediate waves formed and modulated at the point of origin, would be available in the subscriber's tuned local circuit, the second detector circuit shown in Fig. 6ᵃ. As a matter of convenience, subscribers' instruments, in Fig. 6ᵃ may all be tunable within a certain band of frequencies to offset any momentary irregularity or variation in transmission wave length from C, as well as to permit reception of since modulated waves. Inasmuch as modulation of intermediate frequencies may take place at the B stations or even at the C stations by the use of modulator 64 in Fig. 3 and as there will be many of these stations throughout the system, with a corresponding possibility of error, it is to be particularly understood that I contemplate the use of the long or intermediate frequency master wave sent out from station A for the purpose of calibration or tuning to resonance therewith of all the long wave oscillator circuits.

As an alternative method, I may permanently impose the master long wave at superaudio frequency on all the relay stations through the trunks, to excite oscillator or more correctly amplifier tubes so as to produce intermediate frequency or long waves, which may then be modulated, amplified and transmitted in the manner shown herein or any other desired or suitable manner. In this way a master frequency sent out through the system by either long waves over the trunks, or double modulated short waves through the ether, can be used permanently to excite and regulate every long wave transmitter or generator in the system. As described, the B stations would relay the master wave on a short wave carrier to the C stations, maintaining this service constant while the program was in force, but if the master long wave be transmitted over wire trunks, then of course to that extent the wire trunks would be in permanent use for radio.

For rendering special service by broadcasting out with wire return the C stations are provided with modulating transmitters of the type symbolized in Fig. 7, the jack J¹⁰ being used to plug up the telephone circuits of the subscriber, either simultaneously or individually, or perhaps in groups, as the necessity of the case may dictate. The operator must of necessity preside over any such group meeting acting as a monitor while some one of the number of subscribers may act as presiding officer if desired. His line would then be plugged up to jack J¹⁰ in Fig. 7 and everything he said would be conveyed to the other subscribers by the radio waves broadcasted from the antenna shown. The other subscribers would then be similarly plugged up by the operator as called upon. A better method and one which I prefer, is to connect the group through the multiples to the operator's circuit (see Fig. 6ᵃ) and thus maintain connection with them over the wires, as well for listening in on their radio receiving instruments as for receiving their replies. The operator of course can speak to all of them through the transmitter 150, and any one of them can be put on the jack J¹⁰ by the operator to speak to all the others. The details of such a connection may be varied in numerous ways within the knowledge of those skilled in this art and in the telephone art.

The installing, inspecting, testing and maintaining of subscribers' station equipment is all for the C stations. It should be pointed out however that where a subscriber's telephone line terminates in a telephone exchange different from that which constitutes or is associated with the C station for that area, maintenance, equipment, testing, etc. would be for the nearest central station, by preference, whether a broadcasting station or not. There is another reason for this, viz: that the subscriber looks to his own central station for maintenance of his telephone instrument, and it is good practice to unify and not divide in cases of this kind. For this reason, if the radio administration be in the hands of a separate corporation, the actual physical work in connection with the subscriber's station and line equipment, would be in the hands of his local wire exchange. It might be added that to be consistent and in accordance with the best practice, all subscribers' station equipment should belong to those who install it, viz, the telephone companies. The radio corporation gives programs, operates the central office equipment, but for this purpose preferably rents or leases the wire switchboard instrument equipment from the telephone company. The great advantage of this will appear in connection with the discussion of charges and finance.

As regards compiling, editing, and publishing of the radio programs, this is necessarily in the hands of the C stations for their respective areas. Nation wide announcements may be briefly broadcasted over the entire system, local announcements may be similarly broadcasted from B stations and C stations respectively; but time, service, and copper are all too valuable in an organized system, to make any sufficient announcement of regular programs. These should be determined far enough in advance interchanged by mail or by wire reports run through at times when the wires are otherwise idle.

Since the use of the radiophone would naturally be confined to times when the telephone was not in use for business purposes, it is equally true that a certain percentage of telephone use, both business and residence, is unnecessary and can be dispensed with. This includes friendly social visiting which of course is more pronounced in residence districts than in business, and also certain classes of communications that could be postponed to other times without detriment. This means that when the radio system is organized and dependable, so that the public has come to feel a reliance upon it, its use will be attended by a certain modification in the telephone load curves, which will undoubtedly manifest itself at first in modification of the peaks. Business and social conditions fix the location of these peaks which will probably remain unchanged, but the desire to use the wires for radio will curtail the unnecessary use of the wires for telephone purposes greatly to the benefit of both services. This should be specially marked in residence districts where social visiting over the telephone is a vice. In the system proposed herein, the use of the radiophone is made subordinate to the use of the telephone, in so far as the wires are concerned. Hence, since the radiophone is subordinated to the telephone, and since the use of the telephone will therefore be affected to a certain extent by the desirability of the radiophone use, the broadcasting company or companies may actually to a certain extent control the telephone traffic curves by the character of their radio programs at different times. For example, if very attractive offerings be made by radio between twelve and one o'clock it might be expected that telephone use between those hours would be cut down to some extent, the unnecessary calls being obliterated and the necessary calls being so far as possible made earlier or later. In the same way, if the telephone company desired to increase the telephone use at some particular hour, the radio program could be made of such a nature at that hour that the class effecting the telephone curve would not then patronize the radio. For example, if it be desired to concentrate the telephone load between ten and eleven in the morning, stock quotations would not be given at that time, but the program at that time would be made up of items interesting to those who needed them but not such as to attract the average business telephone user. There are certain items which are necessary, though not interesting, which can be put on at different times, for the purpose stated. For example, may be mentioned time signals for jewelers. It is entirely possible to determine the character and amount of the radio load at any time by methods comparable to those used in the earlier day of vaudeville when "chasers" or inferior acts were put on in order to get rid of the long staying patrons. It should be borne in mind that in accordance with present systems, the radio load is a time use load, and therefore it may and probably will be desirable at times to clear the wires for other purposes.

Coming to the subscriber's station, the primary wave frequency which he receives is fixed, but referring to Fig. 3$^a$ it will be observed that the filter coupler 33 shown between his first detector 30 and second detector 31 is provided with variable tuning elements, as are also his antenna circuit 28 and his local input circuit 43. The subscriber may therefore select intermediate frequencies by merely tuning his filter circuit 33. In tuning, both sides must match up as well understood by those skilled in the art. Thus, initial distribution by station A on several frequencies simultaneously results in selection at station B and relaying of the selected items, plus addition of original items, on several frequencies, all of which afford station C the opportunity of selection plus the addition of original matters, for relaying and transmitting to the subscribers D; while the subscribers in turn by tuning their intermediate wave filter circuits can select any and all of the items desired and reject the others. It is of course possible for all the modulated frequencies at A to be relayed from B to C and from C to the subscribers, using whatever number of primary frequencies and intermediate frequencies are available. This might actually occur when a national program was being carried on which must be condensed in point of time, requiring the transmission of several items at once, from which the ultimate subscriber must select those which he would prefer to hear. I consider this arrangement and the method of operating relay stations in an organized system for purposes of selection of program to be new and original with me and shall claim the same accordingly. This applies as well to subscribers' stations as to the intermediate and A stations, and to the entire system as such.

It is of course understood that any or all of the details, construction and operation thus outlined may be changed and modified as necessity, convenience, and the resources of the art from time to time may dictate or permit, without departing from the scope and purview of my invention. I believe I have disclosed a complete and operative system for the purposes described, which is novel in totality, as well as in its several divisions and parts, and that the methods employed throughout are novel, when considered in an organized system. I do not claim the specific circuits shown except as hereinbefore stated, but I do claim the system of the parts and the method of operating the same, as herein disclosed and I wish it distinctly understood that I contemplate all non-essential changes and modifications which may be made therein.

While the master station has been described as being located near the geographical center of the system, it may be permanently or at times located in any division, for example, at New York in the eastern division, controlling other divisions by wire or by radio relaying repeated from division to division. The master station, wherever located is for the time being the center of the system.

What I claim is:

1. A general subdivided wire system and a correspondingly subdivided radio broadcasting system, comprising subscribers' stations scattered over an extended area served by central stations, local and general, interconnected by wires, and means operating to tie the two systems together so that all communication from subscribers can reach any point in the system by wire only, but can reach all or any part of the subscribers' stations in common by radio broadcast, reflected back toward the subscribers, either direct from their own central stations or by successive relay broadcasting according to the scope desired.

2. In a general organized wire signaling system, radio signaling means for signaling from a given point in the system to certain relaying points in said wired system, means at said relaying points for relaying to certain second relaying points in said wired system, means at said second relaying points for relaying to receiving stations at different points in said wire system, and means for directively transmitting a signal from any of said points to said given point for radio transmission therefrom to said second relaying stations and the subscribers' stations served thereby and trunking connections between said first mentioned broadcast transmitting station and the said first order relay stations and trunking connections between said first order relay stations and said second order relay stations, whereby signals may be transmitted from any subscriber's station through said individual lines and trunking connections to said first mentioned broadcast transmitter.

3. In a general organized wire signaling system having a plurality of subscribers' stations divided into primary groups, the stations of each group being connected by wire to a subscriber's service station common to the group, said subscribers' service stations being divided into second groups, a second group radio service station for each second group, said second group service stations being divided into first groups, a main radio service station for said first groups, means for transmitting signals in a direction from said subscribers' stations to the main radio service station by wire through said radio service stations, and in a direction from the main radio service station to the subscribers' stations by radio through said radio service stations.

4. An organized system of radio broadcast distribution in combination with an organized wire system of intercommunication, said wire system consisting of interconnected central stations serving wired subsscribers' stations in groups distributed over an extended area, said radio system comprising sending stations distributed over said area and connected through wire central stations with the wire system and subscribers, means for directional communication between all stations on the radio system over the wires of the other system, and means at said radio stations for distributive broadcasting direct or by relaying to all the radio stations and thence to subscribers, with means to prevent interference at all points on both systems between the respective radio and wire connections.

5. A combined radio and wire system for organized radio broadcast distribution, over an extended area, comprising central stations divided into classes, the largest class serving subscribers' stations and being distributed in local areas for that purpose, intermediate stations less in number than the local stations each related to a group of said local stations for wire trunking and radio relaying, and a head or master station for the group of intermediate stations, with means to transmit broadcast matters from said master stations to said intermediate stations, means at the intermediate stations to relay the signal modulations so received to the local stations, and means at said local stations to relay the same modulations, to the subscribers' stations; said subscribers being equipped with means for wired communication, with their respective local stations, and said local stations in turn being equipped with means for directional communication with their intermediate stations and through them with their master station.

6. A combined radio and wire system for organized radio broadcast distribution over an extended area, comprising central stations divided into classes, the largest class serving subscribers' stations and being distributed in local areas for that purpose, intermediate stations less in number than the local stations each related to a group of said local stations for wire trunking and radio relaying, and a head or master station for a group of intermediate stations, with means to transmit broadcast matters from said master station to said intermediate stations, means at the intermediate stations to relay the signal modulations so received to the local stations, and means at said local stations to relay the same modulations to the subscribers' stations; said subscribers being equipped with means for wired communication, with their respective local stations, and said local stations in turn being equipped with means for directional communication with their intermediate stations and through them with their master station, together with means at each central station to operatively connect the wire lines having terminals therein to radio modulating and transmitting apparatus, or to trunks leading to the next higher broadcasting center, at will, whereby matters picked up over the subscribers' wires may be broadcast either in their own local area only, in the group area served by their intermediate station, or over the entire system.

7. In a radio broadcasting system adapted to serve a large number of subscribers distributed over a wide general area, local or regional telephone exchanges distributed throughout said general area and wire lines from each of said exchanges to all the subscribers in its local area, a plurality of radio broadcasting senders or exchanges, connected to each other through the telephone exchanges by wires, and arranged for broadcasting by relays or stages, from a head station through intermediate stations to local or regional stations associated with said telephone exchanges, whereby radio broadcasting proceeds from the center of the system outward in expanding progression to the subscribers, who by concentration communicate inward by wire stages to the head or any other originating point in the system.

8. A combined telephone and radiophone broadcast distributing system comprising a telephone system with exchanges distributed in different local areas interconnected by trunk lines, subscribers in the local area connected to the telephone exchange centers by wire lines, local radio broadcasting stations in said local areas and coinciding with or closely related to the local or regional telephone exchange centers, radio subscribers connected to the same telephone wires as the telephone subscribers, a master or A station and intermediate or B radio relay stations in the radio distributing system, means to connect said radio subscribers to their local radio or C stations through their wire lines without disturbance of telephone traffic thereover, and thence through wire trunks to intermediate or master stations of the main system with means for changing audio frequency into superaudio frequency or carrier current waves at the C stations.

9. A combined telephone and radiophone broadcasting distributing system comprising a telephone system with exchanges distributed in different local areas interconnected by trunk lines, subscribers in the local area connected to the telephone exchange centers by wire lines, local radio broadcasting stations in said local areas coinciding with or closely related to the local or regional telephone exchange centers, radio subscribers connected to the same telephone wires as the telephone subscribers, a master or A station and intermediate or B radio relay stations in the radio distributing system, means to connect the radio subscribers to their local telephone exchange through their wire lines and thence by trunk lines to their local radio or C stations.

10. A combined telephone and radiophone broadcast distributing system comprising a telephone system with exchanges distributed in different local areas interconnected by trunk lines, subscribers in said local areas connected to the telephone exchange centers by wire lines, local radio broadcasting stations in said local areas and coinciding with or closely related to the local or regional telephone exchange centers, radio subscribers connected to the same telephone wires as the telephone subscribers, a master or A station and intermediate or B radio relay stations in the radio distributing system, means to connect the radio subscribers to their local telephone exchange through their wire lines and thence by trunk lines to their local radio or C stations, and means at said C stations to change audio frequency into superaudio frequency or carrier current waves, for further transmission through the system.

11. A combined telephone and radiophone broadcast distributing system comprising a telephone system with exchanges distributed in different local areas interconnected by trunk lines, subscribers in said local areas connected to the telephone exchange centers by wire lines, local radio broadcasting stations in said local areas coinciding with or closely related to the local or regional telephone exchange centers, radio subscribers connected to the same telephone wires as the telephone subscribers, a master or A station and intermediate or B radio relay stations in the radio distributing system, means to connect the radio subscribers to their local telephone exchange through their wire lines and thence by trunk lines to their local radio or C stations, with means at the C stations for changing audio frequency into superaudio frequency or carrier current waves for further transmission through the system and further means for interchanging said waves from wire to radio and vice versa at any of the A, B, or C stations.

12. A combined radio and wired signaling system for broadcast distribution among subscribers, comprising an A station consisting of a master central station equipped with means for radiophone broadcasting, B stations for relaying the matter broadcasted from the A station, C stations for relaying the matter broadcasted from the B stations, subscribers' stations connected by wire to said C stations and provided with radio receivers arranged to receive matter broadcasted from its connected C station and means for transmitting inward from a subscriber's station to the C, B, or A stations by wire, first by audio through the subscriber's line to the connected C station where it is changed to modulated superaudio frequency waves, then by trunk line from the C station to a B station, then by trunk to the master or A station.

13. A combined radio and wired signaling system for broadcast distribution comprising an A station consisting of a master central station equipped with means for radiophone broadcasting, groups of relay B stations with a master B station in each group, a group of relay C stations for each B station, subscriber's stations connected by wire to said C stations and provided with radio receiving means for receiving from their connected C stations and means for transmitting inwardly from a subscriber's station to the C, B or A stations by wire, first by means of audio frequency waves through the subscriber's wire connection to its connected C station where these are imposed or modulated upon a superaudio carrier wave, then by means of said superaudio carrier transmitted by trunk lines from the C station through the B station of its group to the master B station of the B station group and thence to the A station.

14. A combined radio and wired signaling system for broadcast distribution comprising an A station consisting of a master central station equipped with means for radiophone broadcasting, groups of relay B stations with a master B station in each group, a group of relay C stations for each B station, subscriber's stations connected by wire to said C stations and provided with radio receiving means for receiving from their connected C stations, interstation trunking connections between said C, B and A stations, and means for transmitting inward from a subscriber's station to C, B and A stations, by audio waves through the subscriber's wire connection to the connected C station where the audio waves are imposed upon superaudio carrier waves and the superaudio carrier waves are transmitted over said interstation trunks to said B or A stations.

15. In an organized system of radio broadcast distribution, a plurality of local areas having wire networks with central stations and subscribers' stations served thereby, a plurality of local distributing radio stations C, broadcasting to said subscribers D in their respective areas, a plurality of intermediate radio stations B less in number than the said stations C and broadcasting thereto, and a master station A, each of said stations A, B and C equipped with apparatus for broadcasting matter originating therein, and each of the B and C stations equipped with apparatus for receiving respectively, with wire trunk connections between the C stations and the B stations and between the B stations and the A stations, and means to interchangeably transfer thereover matter to be broadcast from any point in the system inward from C to B or A and outward therefrom to any other point and means to broadcast the same at the point received, for all or any part of the system, according to the order of the station, A, B, or C, so broadcasting the same.

16. In an organized system of radio broadcast distribution, a plurality of local areas having wire networks with central stations and subscribers' stations served thereby, a plurality of local distributing radio stations C, broadcasting to said subscribers D in their respective areas, a plurality of intermediate radio stations B less in number than the said stations C and broadcasting thereto, and a master station A, each of said stations A, B and C equipped with apparatus for broadcasting matter originating therein, and each of the B and C stations equipped with apparatus for receiving respectively, with wire connections from each subscriber's or D station to the C stations in his local area, and wire trunk connections between the C stations and the B stations and between the B stations and the A stations, and means to interchangeably transfer thereover matter to be broadcast from any point in the system inward from C to B or A and outward therefrom to any other point and means to broadcast the same at the point received, for all or any part of the system, according to the order of the station A, B, or C, so broadcasting the same.

17. The combination of an organized radio broadcasting system with an organized wired communication system comprising a plurality of subscribers' stations D grouped in local areas, a local distributing station C for each such area, district relay stations B related to groups of stations C, and a master station A related to all stations B, radio broadcast transmission proceeding from the master station outward through the relay stations B to C, and by relay distribution from C to D, all of said stations being provided with modulators and radio transmitters for broadcasting original matter, means in each local area for connecting the subscribers' stations D to the local broadcasting station C through circuits of the wire system, wire trunk circuits connecting the distributing station C to the district stations B, and other wire trunk circuits connecting said district stations B to the master station A, with radio broadcast transmitters at all of the A, B and C stations adapted to doubly modulate a high frequency carrier wave, and means to connect said wires or trunks to the input side thereof for local or general broadcasting according to the class of the station.

18. A general organized wire system comprising local exchange centers with subscribers' stations connected thereto by wire lines, said exchange centers also interconnected by wire trunk lines, in combination with a general organized radio broadcasting system comprising radio receiving instruments at the subscribers' stations connected to the said subscribers' wire lines of the wire systems, local radio central stations associated with the wire central stations and containing terminals through which connection with said wire lines can be had, and a plurality of radio relay stations arranged in successive stages or territorial sets, and so related that any matter broadcasted will pass from the point of release to and through an increasing number of relay stations by steps or stages to the subscribers, whereby the attenuating effect of distance is destroyed and less power and range are required in any one broadcasting station, while all sending stations are available to all subscribers with simple instruments and equal efficiency.

19. A radio broadcasting and wire signaling system comprising a plurality of radio broadcasting stations arranged in classes so related to each other that a signal may be transmitted from one station and successively relayed through increasing numbers of stations by stages, subscribers' stations adapted to receive from the last relay stations in order, whereby expanding distribution may be effected by radio relaying over a large territory; and wire connections from the subscribers' stations to local telephone exchanges and from said telephone exchanges to all the radio transmitting stations, whereby individual communication with the subscribers may be maintained in all their local areas by means of the wires.

20. A combined telephone and radiophone broadcast distributing system comprising a telephone system with exchanges distributed in different local areas interconnected by trunk lines, subscribers in the local areas connected to the telephone exchange centers by wire lines, local radio broadcasting stations in said local areas and coinciding with or closely related to the local or regional telephone exchange centers, radio subscribers connected to the same telephone wires as the telephone subscribers, a master or A station and intermediate or B radio relay stations in the radio distributing system, means to connect said radio subscribers to their local radio or C stations through their wire lines without disturbance of telephone traffic thereover.

21. A combined telephone and radiophone broadcast distributing system comprising a telephone system with exchanges distributed in different local areas interconnected by trunk lines, subscribers in the local areas connected to the telephone exchange centers by wire lines, local radio broadcasting stations in said local areas and coinciding with or closely related to the local or regional telephone exchange centers, radio subscribers connected to the same telephone exchange centers, radio subscribers connected to the same telephone wires as the telephone subscribers, a master or A station and intermediate or B radio relay stations in the radio distributing system, means to connect said radio subscribers to their local radio or C stations through their wire lines without disturbance of telephone traffic thereover, and thence through wire trunks to intermediate or master stations of the main system.

22. A combined telephone and radiophone broadcast distributing system comprising a telephone system with exchanges distributed in different local areas interconnected by trunk lines, subscribers in said local areas connected to the telephone exchange centers by wire lines, local radio broadcasting stations in said local areas coinciding with or closely related to the local or regional telephone exchange centers, radio subscribers connected to the same telephone wires as the telephone subscribers, a master or A station and intermediate or B radio relay stations in the radio distributing system, means at the local radio or C stations including testing and listening connections for the wire chief going from the radio station C through trunks to the telephone exchange or exchanges in the same local area and so to the subscriber's lines.

23. A combined telephone and radiophone broadcast distributing system comprising a telephone system with a plurality of related exchanges connected by trunks in the same local area, a single local radio broadcasting station in said local area, related to said telephone exchanges by wire connections, and radio subscribers connected to the telephone exchanges by wire lines and thence through trunk lines to the local radio station, with testing and listening connections for the wire chief going from said radio station through trunks to the different branch telephone exchanges and so to the subscribers' lines connected thereto, so that the said wire chief can get access to any of the subscribers' lines in the local area and thereby test and listen in on any radio subscriber's instrument.

24. The combination of an organized wire system and an organized radio system including numerous units or ultimate service stations standardized, requiring no skill to get standard service; with centralized control and relay stations for said standard instruments and means to reproduce throughout the system in all the standard units original modulation waves transmitted from any point, together with interrelated distributing centers adapted to relay in stages each successive stage or group of centers being more numerous than the preceding group until the final group distributes directly to the subscribers' standardized instruments, said instruments being connected with said final group centers for supervision, control and assisting in receiving as well as transmitting.

25. A radio broadcast distributing system including ultimate units or subscribers' stations sub-divided into local groups in local areas, each group related to a local regional or distributing station; these regional stations grouped according to districts and each district group of regional stations related to a district master station; said districts being grouped into divisions, which may conveniently coincide with the geographical standard time divisions of the country; and master stations in said districts related to a central master station, with means at said central master station to originate broadcast matter, means at the district stations to relay said broadcast matter to the local or regional distributing stations, and means at said local distributing station to relay the matter to subscribers, with wire connections from said subscribers' stations to the local distributing stations for repeating back and supervising.

26. A radio broadcast distributing system including ultimate units or subscribers' stations sub-divided into local groups in local areas, each group related to a local regional or distributing station; these regional stations grouped according to districts and each district group of regional stations related to a district master station; said districts being grouped into divisions, which may conveniently coincide with the geographical standard time divisions of the country; and master stations in said districts related to a central master station, with means at said central master station to originate broadcast matter, means at the district stations to relay said broadcast matter to the local or regional distributing station, and means at said local distributing station to relay the matter to subscribers, with wire circuits extending from the subscribers' stations to the local distributing stations and therefrom to the district stations for repeating back, and for bringing in signals to be broadcast, from different points in the system.

27. A radio broadcast distributing system including ultimate units or subscribers' stations sub-divided into local groups in local areas, each group related to a local regional or distributing station; these regional stations grouped according to districts and each district group of regional stations related to a district master station; said districts being grouped into divisions, which may conveniently coincide with the geographical standard time divisions of the country; and master stations in said districts related to a central master station; with means at said master station to originate broadcast matter, means at the district stations to relay said broadcast matter to the local or regional distributing stations, and means at said local distributing stations to relay the matter to subscribers, said master station having means to broadcast into the several time divisions differentially and distinctively, whereby matter may be distributed among the geographical time divisions in order of their clock time.

28. In an organized system of radio broadcast distribution, a plurality of local areas having wire networks with central stations and subscribers' stations served thereby, a plurality of local distributing radio stations C, broadcasting to said subscribers D in their respective areas, a plurality of intermediate radio stations B less in number than the said stations C and broadcasting thereto, and a master station A, each of said stations A, B and C equipped with apparatus for broadcasting matter originating therein and each of the B and C stations equipped with apparatus for receiving, amplifying and relaying matter received from A or B stations, respectively.

29. The method of broadcast distribution which consists in broadcasting through an increasing number of relay stations by steps or stages to local central stations and thence to subscribers' receiving instruments, and supervising the reception at the subscriber's instruments from the local central stations over individual wire connections.

30. The combination of an organized wire system and an organized radio broadcast distributing system, said wire system serving subscribers and carrying a definite fixed traffic load due to the subscribers' wire messages, radio receiving instruments at the same subscribers' stations and associated with the wire instruments thereof, centralized means for radio broadcasting to said subscribers' instruments, and means controlled at said central broadcasting station to adjust the radio load due to use of the subscribers' radio receiving instruments, so as to vary the same substantially inversely as the wire traffic load, whereby the wire and radio organizations may be combined as to parts of apparatus and personnel.

31. The combination of an organized telephone system and an organized radio broadcast distributing system, said telephone system serving subscribers and carrying a definite fixed traffic load due to the subscribers' telephone messages, radio receiving instruments at the same subscribers' stations and associated with the telephone instruments thereof, centralized means for radio broadcasting to said subscribers' instruments, and means controlled at said central broadcasting station to adjust the radio load due to use of the subscribers' radio receiving instruments, so as to vary substantially inversely as the telephone traffic load, whereby the telephone and radio organizations may be combined as to parts of both apparatus and personnel.

32. The combination of an organized wire system and an organized radio broadcast distributing system, said wire system serving subscribers and carrying a definite fixed traffic load due to the subscribers' wire messages, radio receiving instruments at the same subscribers' stations and connected to the wire circuits thereof, centralized means for radio broadcasting to said subscribers' instruments, and means controlled at said central broadcasting station over the subscribers' wire lines to determine the subscribers' use of the radio service and to adjust the radio load due to use of the subscribers' radio receiving instruments, so as to vary substantially inversely as the wire traffic load, whereby the wire and radio organizations may be combined both as to parts of operation of apparatus and personnel.

33. The combination of an organized telephone system and an organized radio broadcast distributing system, said telephone system serving subscribers and carrying a definite fixed traffic load due to the subscribers' telephone messages, radio receiving instruments at the same subscribers' stations and connected to the telephone circuits thereof, centralized means for radio broadcasting to said subscribers' instruments, and means controlled at said central broadcasting station over the subscribers' wire lines to determine the subscribers' use of the radio service and to adjust the radio load due to use of the subscribers' radio receiving instruments, so as to vary substantially inversely as the telephone traffic load, whereby the telephone and radio organizations may be combined as to parts of both apparatus and personnel.

34. The combination of an organized wire system and an organized radio broadcasting system, comprising a wire system serving subscribers and carrying a definite fixed traffic load due to the subscribers' wire messages, a centralized radio broadcasting apparatus with subscribers' radio receiving instruments responsive thereto, circuit connections between the radio broadcasting station and the wire system, and other circuit connections between the subscribers' radio receiving instruments and other wire circuits in the system, and means for regulating the radio use of the wire circuits for all purposes so as to be complementary to the ordinary normal wire traffic.

35. The combination of an organized wire system and an organized radio broadcasting system, said wire system carrying a traffic load attaining definite proportions at different hours of the day, and means for readjusting the radio load curve or use of the service, so as to impose a complementary traffic load on the same system of wires, whereby to transmit the ideal flat load curve for both wires and operators.

36. The combination of an organized wire system and an organized radio broadcasting system, said wire system serving scattered points and carrying a definite traffic load due to the wire messages between said points, centralized means for radio broadcasting, radio responsive means located at points on the wire system, and connected thereto, and means controlled at the central radio broadcasting station for regulating the radio load or use of radio service in inverse order of values with respect to the wire traffic load, that is to say, imposing a radio load of least value when the wire traffic load is the heaviest and vice versa.

37. The combination of an organized wire system and an organized radio broadcasting system, said wire system carrying a definite traffic load due to wire messages, centralized means for radio broadcasting over the area served by said wire system, said means being connected to said wire system for control and regulation of subscribers; radio broadcast receiving instruments located at subscribers' stations in the same area and connected to said wire system, and means for regulating the radio load on said wire system and throughout said area so as to supplement and modify the traffic load curve due to the wire messages.

38. The combination of an organized wire system and an organized radio broadcasting system covering an extended area composed of sub-areas or divisions having different clock time, said wire system in each division carrying definite traffic load due to ordinary wire use, centralized radio broadcasting means adapted to distribute broadcast matter in order of clock time in the different divisions, subscribers' radio receiving instruments in said divisions adapted to receive each its own divisonal broadcasting, and means for adjusting the radio traffic load curve or percentage of radio service use in each division so as to be complementary to the ordinary wire traffic load or wire use in the same divisions, the regulation in each of the divisions being so timed and adjusted as to regulate the entire load in all the time divisions in proper clock time sequence.

39. The combination of an organized wire service system and an organized radio broadcasting system both covering the same extended area including a plurality of time divisions due to the change in clock time from east to west; said wire system including networks serving local areas and trunk wires interconnecting the same, said radio broadcasting system including suitable originating and relay stations with subscribers' receiving instruments divided into groups in said local areas and connected to the wire networks therein; with connections from the radio broadcasting stations to said wire system, and means for routing radiophone traffic, due to the use of the radio service, over wire trunks between separated stations or networks, so that in the gradual working westward of the radio load from division to division, it will be so regulated as to keep the peaks of that load off the trunk wires at the times of other peak load due to ordinary wire use.

40. The combination of an organized wire system and an organized radio broadcasting system, said wire system carrying a definite load of wire traffic and said radio broadcasting system being equipped to transmit intelligence by means of modulated intermediate frequency or long waves either over said wire system or on short carrier waves through the ether, interchangeably, switchboard apparatus and trunk wires connected to said wire system available and adapted to be handled by the radio broadcasting organization, and means to regulate and route the radio traffic thereover so as to supplement and not interfere with the wire traffic.

41. The combination of an organized wired telephone system and an organized radio broadcasting system, said telephone system including central office switchboards and subscribers' stations connected thereto with trunk line connections between said switchboards, and said radio broadcasting system including central switchboards and subscribers' stations connected through the telephone wires, with means at said radio switchboards and said radio subscribers' stations, for giving separate telephone service through the radio switchboards over the telephone wires but without going through the telephone switchboards.

42. The combination with a wired system of communication having subscribers' central stations interconnected by wire trunk lines and a group of subscribers' stations for each central station connected thereto by wire; of means for generating a plurality of waves of different given frequencies capable of transmission over said trunk lines, some for radio broadcast purposes and some for wire communication purposes, relay stations interconnected by trunk lines with said central stations with means for detecting the long wave frequencies allotted to broadcast purposes and for retransmitting the same as modulations on a radio frequency wave, radio receiving means at said subscribers' stations, means at certain of said central stations for radio broadcasting with a modulator circuit for said broadcasting means arranged to be tuned to the long wave frequencies allotted to radio broadcast purposes, and means for detecting and transmitting said long wave frequencies over any of said trunks from and to any point in the system.

43. The combination of an organized wire telephone system and an organized radio broadcasting system, said telephone system having central office switchboards and subscribers' telephone instruments connected thereto through their wire lines, and said radio broadcasting system comprising centralized radio broadcasting means and subscribers' radio receiving instruments, both connected to and adapted to give service in part over said telephone wire lines, each of said subscribers' radio receiving instruments consisting in part of an extension telephone, and said centralized radio broadcasting stations being equipped with telephones and telephone switching apparatus, whereby radio broadcast service may be given in one direction from the central station to the subscriber's station, and a complementary return service from the subscribers to the central radio station over wires without interfering with the telephone switchboard service.

In testimony whereof I hereunto affix my signature.

EDWARD E. CLEMENT.